US007367444B2

(12) United States Patent
Blümle

(10) Patent No.: US 7,367,444 B2
(45) Date of Patent: May 6, 2008

(54) DEVICE AND METHOD FOR OPTIONALLY DRAWING IN A CUTOUT FROM A STACK OF SEVERAL CUTOUTS, OR TAKING OVER A CUTOUT FROM A SEPARATING CUTTING MACHINE

(75) Inventor: Martin Blümle, Horhausen (DE)

(73) Assignee: Winkler + Dünnebier Aktiengesellschaft, Neuwied (DE)

( * ) Notice: Subject to any disclaimer, the term of this patent is extended or adjusted under 35 U.S.C. 154(b) by 254 days.

(21) Appl. No.: 11/125,701

(22) Filed: May 10, 2005

(65) Prior Publication Data

US 2005/0253328 A1 Nov. 17, 2005

(30) Foreign Application Priority Data

May 11, 2004 (DE) ..................... 10 2004 023 222

(51) Int. Cl.
*B65G 13/02* (2006.01)

(52) U.S. Cl. .............................. 198/689.1; 414/794.4; 271/98

(58) Field of Classification Search ............. 198/689.1; 414/795.4, 797, 797.4, 797.6, 794.4; 271/94, 271/96, 98, 99
See application file for complete search history.

(56) References Cited

U.S. PATENT DOCUMENTS 4,269,405 A * 5/1981 Mitzel ......................... 271/94
5,088,717 A * 2/1992 Hamanaka et al. ........... 271/98
6,068,253 A 5/2000 Müller
6,446,955 B1 * 9/2002 Janatka et al. ................ 271/96
6,773,006 B2 * 8/2004 Andreyka et al. ............ 271/96

FOREIGN PATENT DOCUMENTS

DE 101 19 408 A1 11/2001
DE 101 28 276 A1 12/2002
EP 0 947 454 A 10/1999

* cited by examiner

*Primary Examiner*—James R. Bidwell
(74) *Attorney, Agent, or Firm*—Collard & Roe, P.C.

(57) ABSTRACT

A device for optionally or selectively drawing in a cutout from a stack of several cutouts, or taking over a cutout from a separating cutting device, which separates the cutout from a material web, includes a vacuum guide roller in which the cutout coming from the stack or the cutout that has been taken over can be passed to a subsequent work station for processing of the cutout in a work cycle, at a cycle speed. This device reduces both production costs and machine maintenance costs, reduces the amount of space required for the machine and generates less noise. The vacuum guide roller is configured as a segment roller in which optionally or selectively the cutout can be drawn in from the stack and accelerated to the cycle speed, or the cutout taken over from the separating cutting device can be accelerated to the cycle speed.

7 Claims, 3 Drawing Sheets

DEVICE AND METHOD FOR OPTIONALLY DRAWING IN A CUTOUT FROM A STACK OF SEVERAL CUTOUTS, OR TAKING OVER A CUTOUT FROM A SEPARATING CUTTING MACHINE

CROSS REFERENCE TO RELATED APPLICATIONS

Applicant claims priority under 35 U.S.C. §119 of German Application No. 10 2004 023 222.9 filed May 11, 2004.

BACKGROUND OF THE INVENTION

1. Field of the Invention

The present invention relates to a device and a method for optionally or selectively drawing in a cutout from a stack of several cutouts, or taking over a cutout from a separating cutting device, which separates the cutout from a material web. Cutouts in the sense of the present invention can be not only envelope cutouts, but also, for example, label cutouts or cutouts for lids to close off containers, particularly food containers.

2. The Prior Art

Two types of envelope production machines are known. In one type of machines, ready-cut envelope cutouts made available in stacks are drawn in by way of a so-called single-sheet intake. The drawn-in cutouts are then processed to produce envelopes. Such machines are usually referred to as sheet machines, where the term “sheet” indicates that individual cutout sheets are processed. In contrast to this type of machine, in the other type of machine, a material web, i.e. paper web rolled up onto a supply roll is processed to produce envelopes. Here, the material web is drawn into the machine directly from the supply roll, and cut to size at a suitable location of the processing path, by a separating cutting machine. In this way, the envelope cutouts are formed only within the envelope production machine. Such machines are referred to as roll machines.

So-called combination machines are also known, in which the operator of the machine can decide, as needed or on the basis of other circumstances, whether he/she wants to process cutouts that are present individually, by way of single-sheet intake, or a material web, i.e. paper web that has been wound up onto a supply roll. FIG. 3 shows that region of a combination machine known from the state of the art in which optionally or selectively, cutouts that are present individually or a material web can be drawn in.

If the combination machine is operated in the single-sheet intake operating mode, a single-sheet intake device 7 is used. In this connection, the bottommost cutout of a stack 2 that consists of several cutouts is pulled out from stack 2, by means of a first segment roller 8 that rotates clockwise and has suction air applied to it.

Segment rollers are known in the state of the art and have two different radii. These radii extend over a certain circumference region of the roller, in each instance, so that a step, which can be rounded off, occurs at two points of the circumference, in each instance. The segment roller usually rotates at a constant speed of rotation and works together with a counter-roller, which preferably consists of rubber and is passively driven by the segment roller. The envelope cutouts move through between the segment roller and the counter-roller, whereby only that circumference region of the segment roller that has the greater radius comes into contact with the cutout. The step of the segment roller that first comes into contact with the cutout to be accelerated is referred to as the grab edge. Since a segment roller accelerates the cutout in sudden manner after it has grabbed it, the segment roller is also referred to as a rip roller.

In FIG. 3, a segment roller 8 accelerates the cutout drawn in from stack 2 to the so-called cycle speed of the envelope production machine, and passes it, with precise register, to a transport roller 9 to which suction air is applied and which rotates counterclockwise. Transport roller 9 in turn passes the cutout on to a vacuum guide roller 10 that rotates clockwise. Vacuum guide roller 10 passes the cutout on further to a first work station 11 of the envelope production machine. Vacuum guide roller 10 is a cylindrical roller having suction air openings in the mantle surface, which are used to hold the cutouts on the roller circumference temporarily.

If the known envelope production machine is supposed to draw a material web 12 in from a supply roll, in contrast to single-sheet intake, the web guide or feed device 13 shown in FIG. 3 is used. Material web 12, which comes from a supply roll, not shown, is passed to a shape-cutting device 14 by way of a plurality of deflection rollers, which are not of particular interest here; the device essentially performs shaping cuts at the two edges of the material web. In FIG. 3, a one-piece material web 12 continues to be transported below a shape-cutting device 14. A separating-cut or cutting device 15 finally separates envelope cutouts from material web 12.

A second segment roller 16 that rotates clockwise and has suction air applied to it then grabs the separated cutout with its grab edge, and accelerates it to cycle speed. Finally, transfer of the accelerated cutout to vacuum guide roller 10 occurs, which passes it on further to a subsequent work station 11.

The known combination machine according to FIG. 3 has several disadvantages. For example, the production and maintenance costs in connection with the two segment rollers 8 and 16 are relatively high, and of course these high costs are undesirable. Furthermore, the so-called format change-over times, i.e. the time periods that are required to refit the machine from a first envelope format to a second envelope format are relatively long. These format change-over times are long because, in particular, two segment rollers 8 and 16 have to be replaced. Furthermore, the combination machine according to FIG. 3 requires not only the two segment rollers 8 and 16 but also additional transport rollers and deflection rollers, some of which have to have suction air applied to them cyclically. This arrangement results in both an increased generation of noise, and a greater need for space.

SUMMARY OF THE INVENTION

It is an object of the present invention to provide a device and a method, respectively, for optionally or selectively drawing in a cutout, particularly an envelope cutout, from a stack of several cutouts, or taking over a cutout from a separating cutting machine, which device or method simultaneously reduces the costs for the production and the maintenance of the machine, reduces the amount of space required for the machine, and results in less generation of noise.

These and other objects are accomplished, according to one aspect of the invention, by means of a device wherein the vacuum guide roller, by means of which optionally or selectively the cutout coming from a stack of several cutouts or the cutout that has been taken over from a separating cutting device which separates the cutout from a material web, is a segment roller by means of which optionally or selectively the cutout can be drawn in from the stack and accelerated to the cycle speed or the cutout taken over from a separating cutting device which separates the cutout from a material web can be accelerated to the cycle speed.

In accordance with another aspect, a method is provided wherein drawing in of the cutout from the start and acceleration of the cutout coming from the stack to the cycle speed, on the one hand, or acceleration of the cutout that was taken over from the separating cutting device to the cycle speed, on the other hand, takes place by means of the same segment roller, to which suction air is applied in each instance. Further embodiments of the present invention are discussed below.

According to the invention, the vacuum guide roller known from the state of the art as shown in FIG. 3 is configured as a segment roller that has suction air applied to it. By means of this segment roller, optionally or selectively a cutout can be drawn in from the stack comprising several cutouts and accelerated to the cycle speed, or instead, the cutout taken over from the separating cutting device can be accelerated to the cycle speed. The advantage according to the invention is that the cutouts can be accelerated to cycle speed by means of a single segment roller that has suction air applied to it. This single segment roller can accelerate the cutouts both for single-sheet intake operation and for operation where the cutouts are separated from a material web. The cutouts can be passed onto a subsequent work station for processing the cutout in a single work cycle, with precise register. This arrangement has the equally advantageous result that the transport and deflection rollers that are known from the state of the art, for example the transport roller 9 in FIG. 3, are no longer required, so that the expenditure for production and maintenance that is connected with them is eliminated, and these rollers, which are no longer present, cannot generate any noise. The format change-over times can be significantly reduced, since only a single segment roller has to be replaced when refitting the machine from one envelope format to another.

In the case of web operation, the segment roller according to the invention naturally cannot take the cutouts over directly from the separating cutting device, since first, a segment of the material web having a length that corresponds to the desired length of the cutout must pass through the separating cutting device. Preferably, a transport belt device is therefore disposed between the separating cutting device and the segment roller; this device can be, in particular, a suction belt device, where the cutouts are held on the transport belts by means of suction air. Both a transport belt device having one or more transport counter-rollers disposed directly adjacent to the transport plane and a suction belt device generate less noise than transport rollers that have suction air applied to them cyclically.

The transport belt device between the separating cutting device and the segment roller can be disposed so that it can be moved away or removed from the segment roller, if necessary. In this way, sufficient space may be created for placement of the single-sheet intake device during single-sheet operation. Likewise, if necessary, the single-sheet intake device can be moved away or removed from the segment roller, if this removal is required to dispose the transport belt device for the purpose of web operation. The corresponding mobility of the transport belt device and/or the single-sheet intake device can be achieved by means of mounting them in linear guides or pivoting guides. It is also possible to configure the entire web feed device, on the one hand, as well as the single-sheet intake device, on the other hand, in modular construction, so that the module not being used, in each instance, can be completely removed and stored.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
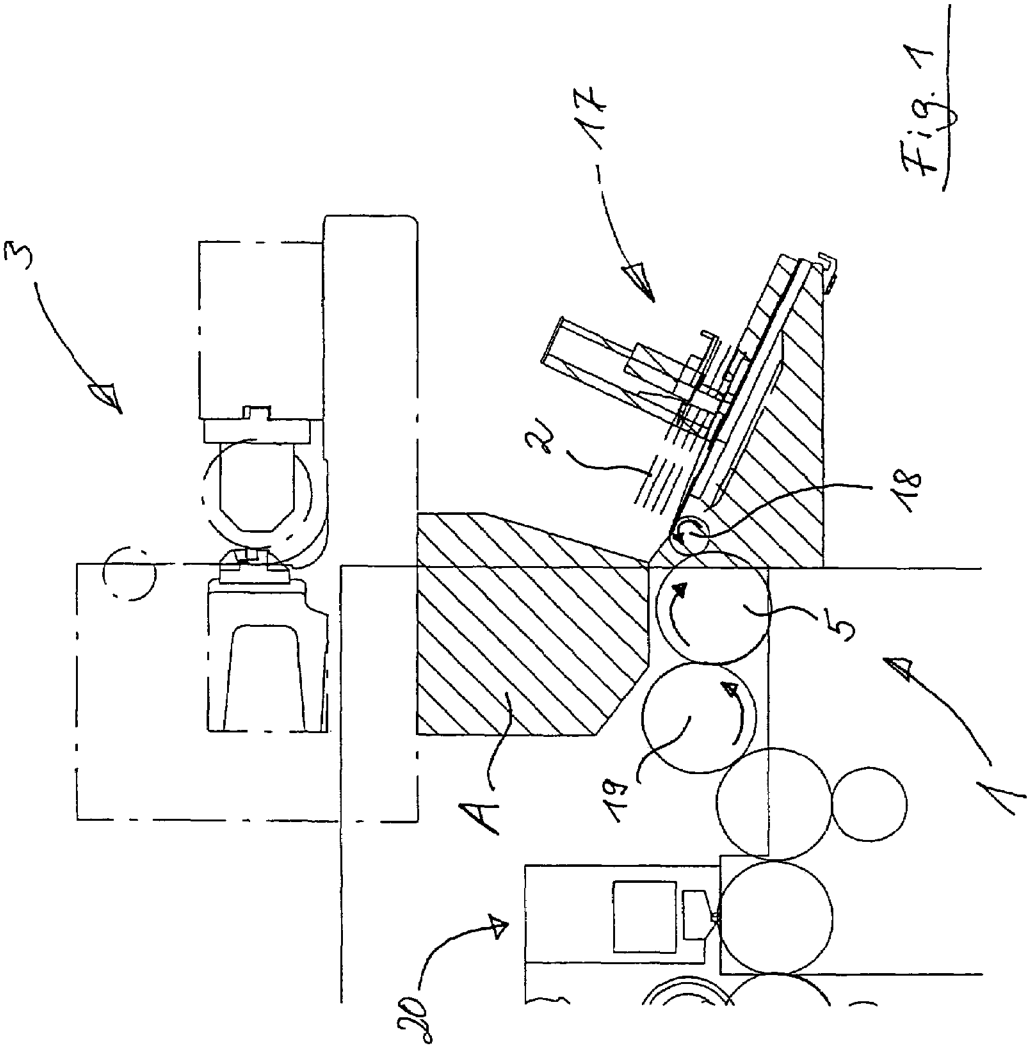
FIG. 1 shows a schematic sectional view of a device according to an embodiment of the invention, which draws cutouts in from a stack including several cutouts, and accelerates them to cycle speed.

Turning now in detail to the drawings, FIG. 1 shows the device 1 according to the invention in a configuration intended for single-sheet intake. A separating cutting device 3 is not needed in this configuration, and no transport devices of any kind are located in the hatched region A below separating cutting device 3, in the embodiment shown here.

In a known single-sheet intake device 17, there is a stack 2 that is made up of a plurality of envelope cutouts that are stacked on top of one another. The bottommost cutout of stack 2 is passed to a segment roller 5, which rotates clockwise at a constant speed of rotation, by way of a deflection roller 18 that rotates counterclockwise and to which suction air is applied. Segment roller 5, to which suction air is also applied, grabs the cutout that is passed to it with its grab edge, not shown here, at a certain distance from the leading front edge of the cutout.

Segment roller 5 accelerates the cutout, with precise register, to the cycle speed of the envelope production machine. For this purpose, segment roller 5 has suction air bores in its segment insert rails, in known manner. Segment roller 5 also has suction air bores in its mantle surface regions that trail in the direction of rotation. After the cutout has gone through a certain angular distance, adhering to segment roller 5, it is finally passed over to a transport roller 19, to which suction air is applied. Transport roller 19 rotates counterclockwise, at the cycle speed, and the envelope cutout is transported further to a subsequent window-cutting station 20 of the envelope production machine, in this embodiment as shown. Alternatively, segment roller 5 can pass the cutout on to a flat transport segment that lies essentially below it, which can be a transport belt device, for example.

Figure 2:
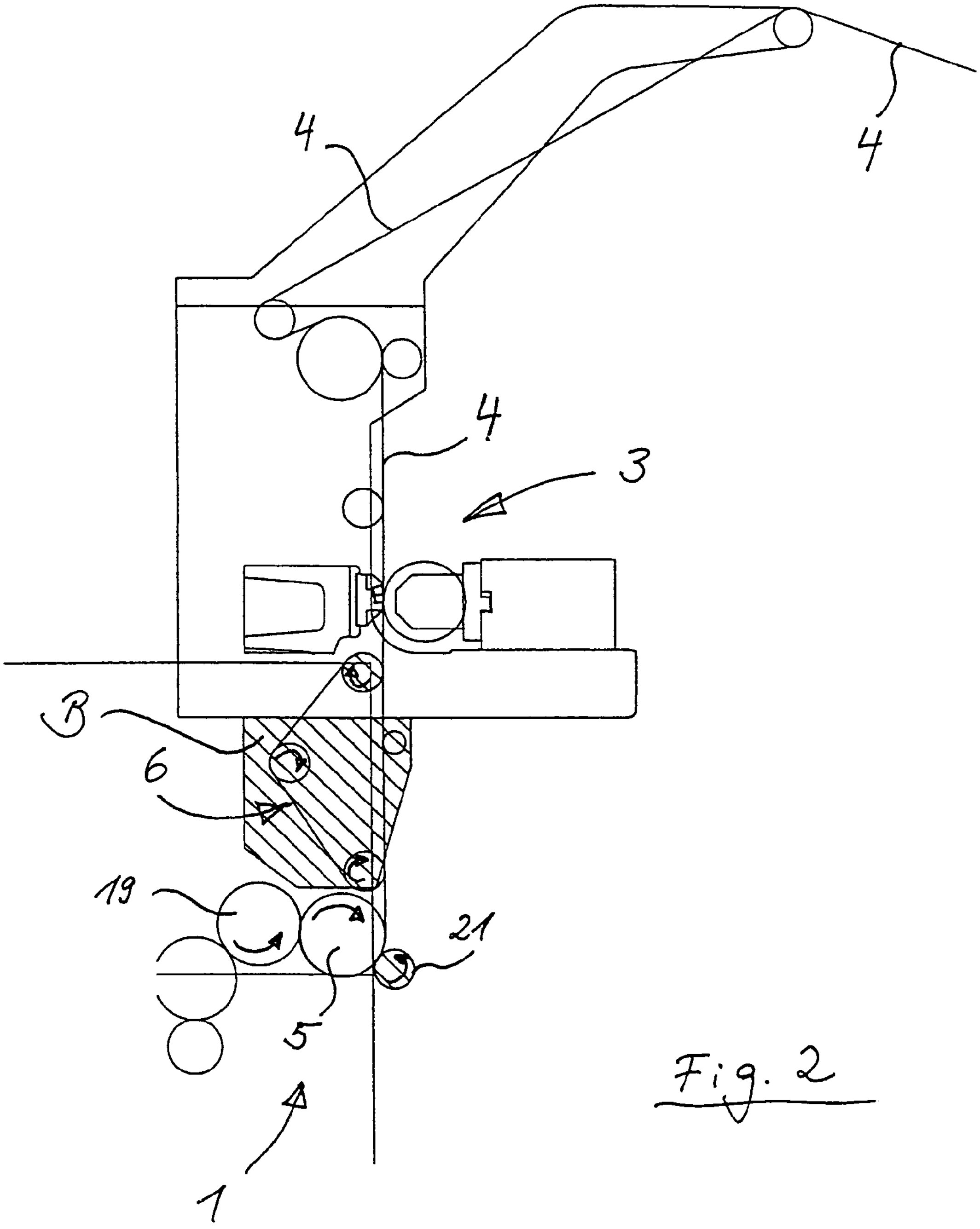
FIG. 2 shows a schematic sectional view of a device according to an embodiment of the invention, which takes over cutouts that have been separated from a material web by a separating cutting machine, and accelerates the cutouts to cycle speed.

FIG. 2 shows device 1 according to the invention in the configuration for taking over and accelerating an envelope cutout that is separated from a material web 4, i.e. in the configuration of web operation. Single-sheet intake device 7 shown in FIG. 1 is not needed with this type of operation, and was therefore removed. As can be seen, a material web 4 is passed to a separating cutting device 3, by way of several deflection and transport rollers, coming from a supply roll, not shown. Separating cutting device 3 separates a cutout having a predetermined length from material web 4, in known manner. The separated cutout is transported further to a segment roller 5, to which suction air is applied, by means of a transport belt device 6 that extends essentially in the hatched region B, which corresponds to the hatched region A in FIG. 1.

Segment roller 5, which rotates clockwise, here again grabs the cutout at a predetermined distance from its leading front edge, with the grab edge, not shown, and accelerates it to cycle speed. After a certain angular distance has been traveled, segment roller 5 passes the accelerated cutout on to transport roller 19, which rotates counterclockwise and has suction air applied to it. Transport roller 19 in turn transports the cutout further to a subsequent work station of the envelope production machine. Segment roller 5 works together with a counter-roller 21, which rotates counter-clockwise, in grabbing and accelerating the cutout. The passage gap between segment roller 5 and counter-roller 21 is adjustable, by means of moving counter-roller 21 towards segment roller 5 or away from segment roller 5. Furthermore, counter-roller 21 is preferably resilient, by being coated with a rubber mantle.

As is evident from FIGS. 1 and 2, segment roller 5 can therefore optionally or alternately take on the following two functions:

a) In accordance with FIG. 1, segment roller 5 functions as a single-cutout intake roller that draws in individual cutouts from a stack that includes several cutouts, with precise register, and subsequently accelerates the cutout that has been drawn in to the cycle speed of the envelope production machine.

b) In accordance with FIG. 2, segment roller 5 functions, in the case of an envelope production machine that draws the material web 4 in, as an acceleration roller that takes over the cutout separated from material web 4 with its grab edge, in precise coordination with the cycle, and subsequently accelerates the cutout to the cycle speed of the envelope production machine.

Figure 3:
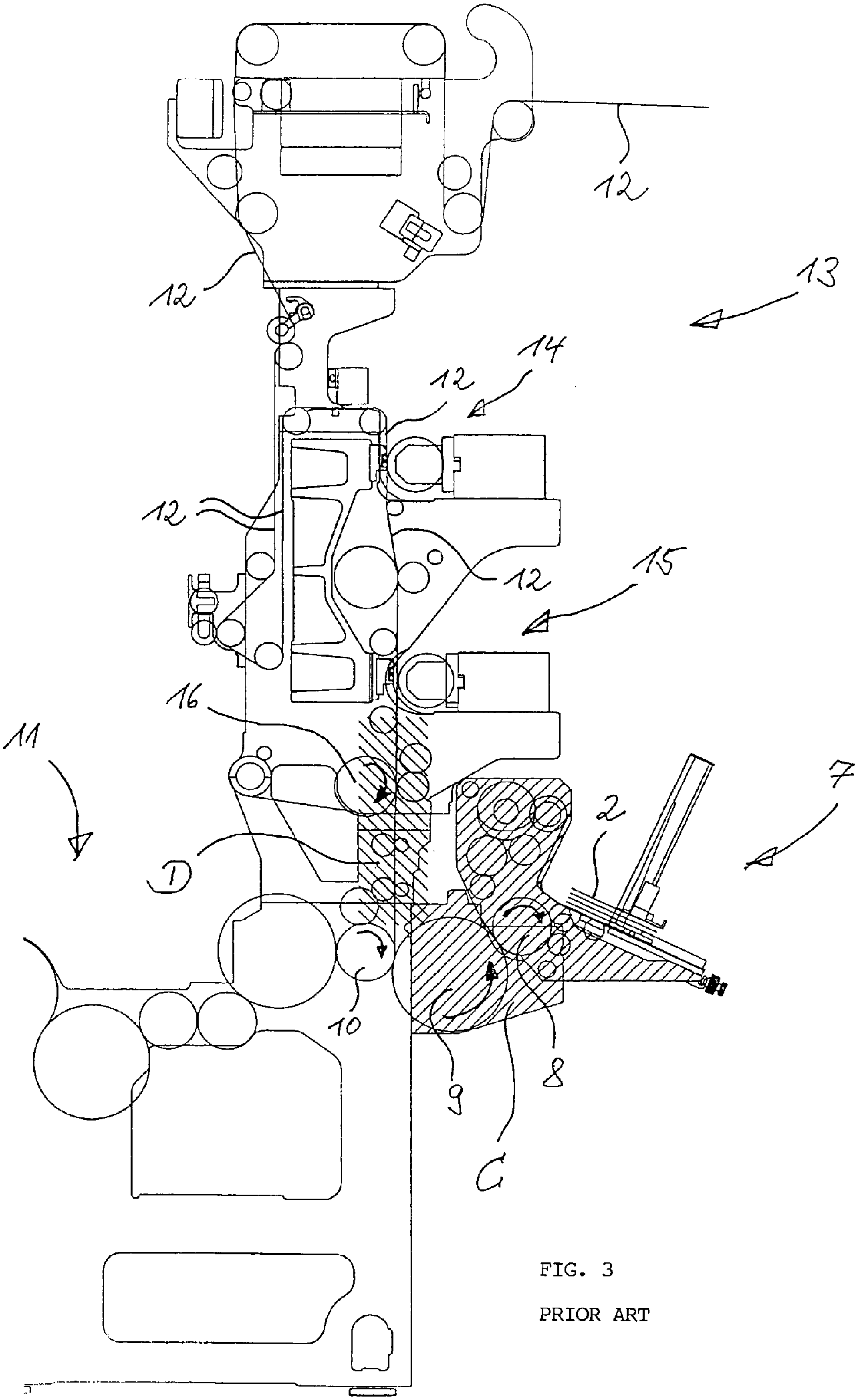
FIG. 3 PRIOR ART
FIG. 3 shows a schematic sectional view of the front region of a combination machine for optional single-sheet or web operation, known from the state of the art.

Segment roller 5 combines the two functions of the first and second segment roller 8 and 16 (see FIG. 3) known from the state of the art, in a single roller. As can be seen from a comparison of FIGS. 1 and 2, with FIG. 3, the deflection and transport rollers which are present in the hatched regions C and D of FIG. 3 can therefore be eliminated.

This arrangement results in the advantages according to the invention, of lower production and maintenance costs, a lesser space requirement, as well as a reduced generation of noise, because several rollers that are required in the state of the art and cyclically have suction air applied to them are eliminated.

Although only a few embodiments of the present invention have been shown and described, it is to be understood that many changes and modifications may be made thereunto without departing from the spirit and scope of the invention as defined in the appended claims.

What is claimed is:

1. A device for selectively drawing in a cutout from a stack of a plurality of cutouts and taking over a cutout from a separating cutting device separating the cutout from a material web comprising a vacuum guide roller for passing the cutout to a work station for processing the cutout in a work cycle at a cycle speed, said vacuum guide roller being formed as a segment roller for drawing the cutout in from the stack and for taking over the cutout from the separating device, said segment roller accelerating the cutout to the cycle speed.

2. The device according to claim 1, further comprising a transport belt device disposed between the separating cutting device and the segment roller for taking over the cutout from the separating cutting device.

3. The device according to claim 2, wherein the transport belt device is a suction belt device.

4. The device according to claim 2, wherein the transport belt device is removable from the segment roller for drawing the cutout in from the stack.

5. The device according to claim 1, further comprising a single-sheet intake device, said single-sheet device being removable from the segment roller for taking over the cutout from the separating cutting device.

6. An envelope production machine comprising a device for selectively drawing in a cutout from a stack of a plurality of cutouts or taking over a cutout from a separating cutting device separating the cutout from a material web, said device comprising a vacuum guide roller for passing the cutout to a work station for processing the cutout in a work cycle at a cycle speed, said vacuum guide roller being formed as a segment roller for drawing the cutout in from the stack and for taking over the cutout from the separating cutting device, said segment roller accelerating the cutout to the cycle speed.

7. A method for selectively drawing in a cutout from a stack of a plurality of cutouts and taking over a cutout from a separating cutting device separating the cutout from a material web comprising the steps of (a) selectively drawing in a cutout from a stack of a plurality of cutouts or taking over a cutout from a separating cutting device separating the cutout from a material web;

(b) accelerating the cutout to a cycle speed;

(c) passing the cutout to a work station for processing the cutout in a work cycle;

wherein drawing in of the cutout from the stack and acceleration of the cutout to the cycle speed or acceleration of the cutout taken over from the separating cutting device to the cycle speed takes place by an identical segment roller to which suction air is applied.

* * * * *